United States Patent [19]

Morton

[11] 4,348,612
[45] Sep. 7, 1982

[54] COMPACT FLUORESCENT LAMP UNIT FOR THREE-WAY FLUORESCENT LAMP FIXTURE

[75] Inventor: Edward W. Morton, Teaneck, N.J.

[73] Assignee: Westinghouse Electric Corp., Pittsburgh, Pa.

[21] Appl. No.: 232,286

[22] Filed: Feb. 6, 1981

[51] Int. Cl.³ .................. H01J 7/44; H05B 37/02
[52] U.S. Cl. .................................. 315/58; 315/72; 315/362
[58] Field of Search ............... 315/362, 58, 71, 72

[56] References Cited

U.S. PATENT DOCUMENTS 2,817,004 12/1957 Baumgartner .
4,178,535 12/1979 Miller .................................. 315/53
4,270,071 5/1981 Morton ............................. 315/58

OTHER PUBLICATIONS

"Conversion of Incandescent Lamp Socket", by Dale et al, Lighting Design & Application, Mar. 76, pp. 18-23.

Primary Examiner—Harold A. Dixon
Attorney, Agent, or Firm—R. S. Lombard

[57] ABSTRACT

A compact fluorescent lamp unit for use with a three-way incandescent-type lamp fixture. The compact fluorescent lamp unit includes a compact fluorescent discharge device of predetermined configuration, a ballast inductor and two capacitors, and housing and support means for supporting the discharge device and housing the ballast inductor. When the switch of the incandescent-type lamp fixture is switched the compact fluorescent discharge device is switched, successively, from a deenergized state; to a low-light output state; to a medium-light output state; and, finally, to a high-light output state.

1 Claim, 3 Drawing Figures

COMPACT FLUORESCENT LAMP UNIT FOR THREE-WAY FLUORESCENT LAMP FIXTURE

BACKGROUND OF THE INVENTION

This invention relates to compact fluorescent lamp units and, in particular, to a compact fluorescent lamp unit for a three-way incandescent-type lamp fixture.

It is well known that a fluorescent lamp is more efficient than a incandescent lamp by a factor of three to four or more for equivalent illumination and that a fluorescent lamp has a much longer service life compared to that of a incandescent lamp. In the past, fluorescent lamps have not been used to any appreciable degree for indoor residential lighting because of their poor color rendering properties, as compared to incandescent lighting. In recent years, though, fluorescent lamps are available with both a high luminous output and a color appearance and color rendition comparable to incandescent. Increased residential use of fluorescent illumination, with attendant savings of energy can be achieved from the development of fluorescent lamp systems which are directly compatible with existing incandescent-type sockets.

One such lamp system is disclosed in U.S. Pat. No. 2,817,004 dated Dec. 17, 1957, issued to Baumgartner, et al. This patent discloses a combined adapter and holder for circular tubular fluorescent lamps. The combined adapter and holder are mountable on existing light fixtures designed for incandescent lamps equipped with screw-type bases and with the plane of the circular lamp envelope being essentially vertical.

In an article appearing in *Lighting Design and Application,* Mar. 1976 edition, entitled "Conversion of Incandescent Lamp Sockets to Fluorescent in the Home Market" by E. A. Dale, a retrofit lighting system for converting incandescent fixtures to fluorescent is disclosed.

In U.S. Pat. No. 4,178,535, dated Dec. 11, 1979, issued to Jack V. Miller is disclosed a three-way brightness fluorescent lampholder fitting, utilizing one or more ballast inductors.

SUMMARY OF THE INVENTION

This invention comprises a compact fluorescent lamp unit for use with a three-way incandescent lamp fixture. The fixture includes an incandescent-lamp-type socket comprising a generally cylindrical metallic screw-type socket member. The socket member forms a first metallic conductive member, and second and third metallic conductive members are mounted in the bottom portion of the socket. A four-position switching means includes first and second contacts. The switching means has a first open position, a second position in which potential is applied between the first and second metallic conductive members, a third position in which potential is applied between the first and third metallic conductive members, and a fourth position in which potential is applied between the first and second metallic conductive members and the first and second metallic conductive members. Electrical conductor means adapted to connect the socket to a source of energizing potenial is also included.

The compact fluorescent lamp unit comprises a compact fluorescent discharge device comprising an elongated vitreous bulb or predetermined configuration defining an elongated circuitous discharge path and enclosing a fill comprising mercury and an inert gas. The elongated bulb has electrodes operatively disposed proximate the ends of the defined discharge path. End caps are hermetically sealed to the ends of the bulb. Each of the electrodes has lead-in members affixed to the ends thereof and sealed through the end cap means.

The compact fluorescent lamp unit further comprises housing and support means having an upper and lower portion. The upper portion of the housing and support means supports said bulb in a rigidly fixed position. The lower portion of the housing and support means has affixed thereto a screw-type base comprising a metallic shell. A glass plug is affixed to the bottom portion of the metallic shell and secures a portion of a conductive center eyelet member to fix the center eyelet member in predetermined position such that when the lamp unit is screwed into the socket, the eyelet electrically contacts the third metallic conductive member. A conductive ring member is affixed to the glass plug in predetermined position and encircles the conductive center eyelet member in electrical isolation from it. The conductive ring member is positioned such that when the lamp unit is screwed into the socket, the ring member electrically contacts the second metallic conductive member.

The compact lamp unit also comprises a ballast inductor having at least a portion thereof supported by the housing and support means. One end of the ballast inductor is connected in circuit with a common electrical point and the other end of the ballast inductor is connected in circuit with one of the lead-in members of a first of the electrodes. Capacitive energy storage means comprise two individual capacitors. A first of the capacitors is connected in circuit between the common electrical point and the second metallic conductive member. The second of the capacitors is connected in circuit between the common electrical point and the third metallic conductive member. One of the lead-in members of a second of the electrodes is connected in circuit with the metallic shell. The other of the lead-in members of the first and second electrodes is connected in circuit with a starting means.

In the first switch position the ballast inductor is deenergized and the lamp unit is off. In the second switch position, both the first capacitor and the ballast inductor are energized and the lamp is in a low-light output state. In the third switch position the second capacitor and the ballast inductor are energized and the lamp unit is in a medium-light output state. In the fourth switch position both the first and second capacitors and the ballast inductor are energized and the lamp unit is in a high-light output state.

BRIEF DESCRIPTION OF THE DRAWINGS

For a better understanding of the invention, reference may be had to the preferred embodiments exemplary of the invention, shown in the accompanying drawings, in which.

DESCRIPTION OF THE PREFERRED EMBODIMENT

Figure 1:
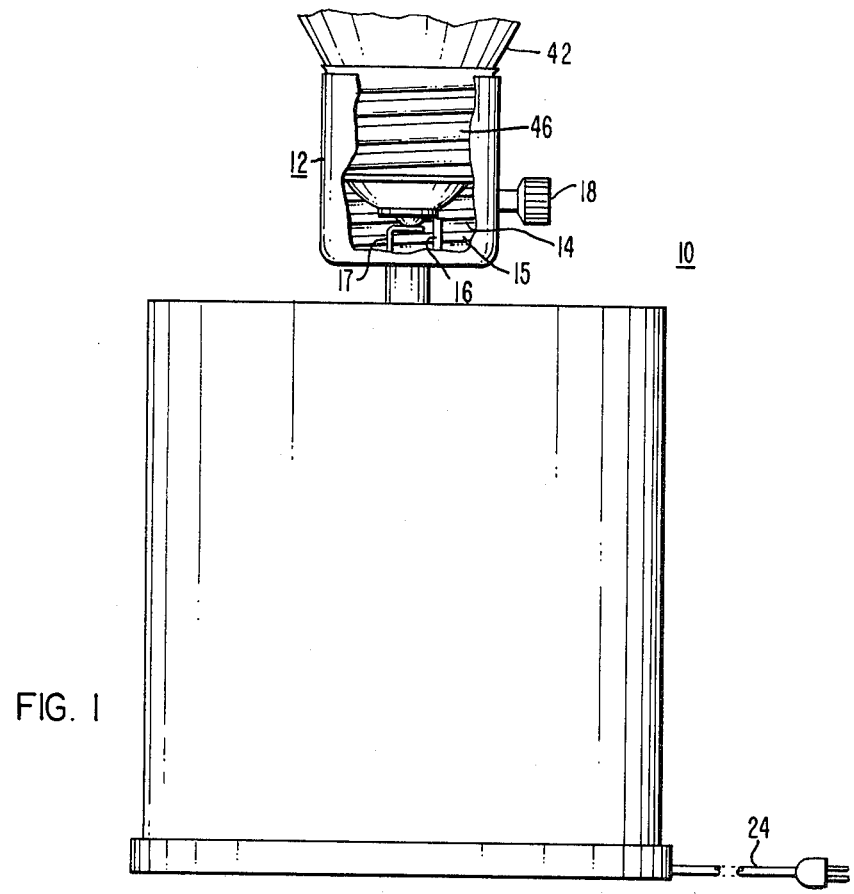
FIG. 1 is an elevational view, partly broken away, of the socket and base of a typical three-way incandescent lamp fixture.

Referring to FIG. 1 there is shown a three-way incandescent lamp fixture base 10. The fixture base 10 may be for residential floor lamp or residential table lamp, for example. The fixture base 10 includes an incandescent-lamp-type socket 12 comprising a generally cylindrical metallic screw-type socket member 14 which forms a first metallic conducting member 15. The second and third metallic conducting members 16, 17 are mounted in the bottom portion of the socket 12. A four position switching means 18 includes first and second third and fourth contacts 20a, 20b, 20c and 20d and a rotatable member 19 shown in FIG. 2. The four-position switch 18 has a first open position in which both the first and second contacts 20a, 20b are open; a second position in which the first contact 20a is closed and potential is applied between the first and second metallic conductors 15, 16; a third position in which only the second contact 20b is closed and potential is applied between the first and third metallic conductors 15, 17; and, a fourth position in which both the contacts 20c are closed by member 19 and potential is applied between the first and second metallic conductors 15, 16 and the first and third metallic conductors 15, 17. Electrical conductor means 24 is adapted to connect the socket 12 to a source of energizing potential.

Figure 2:
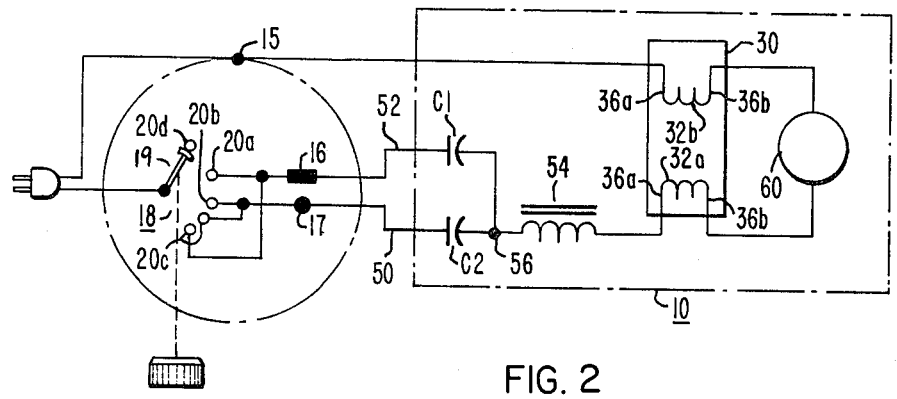
FIG. 2 is a schematic diagram of the compact fluorescent lamp unit of the present invention in circuit with the three-way incandescent lamp fixture.
Figure 3:
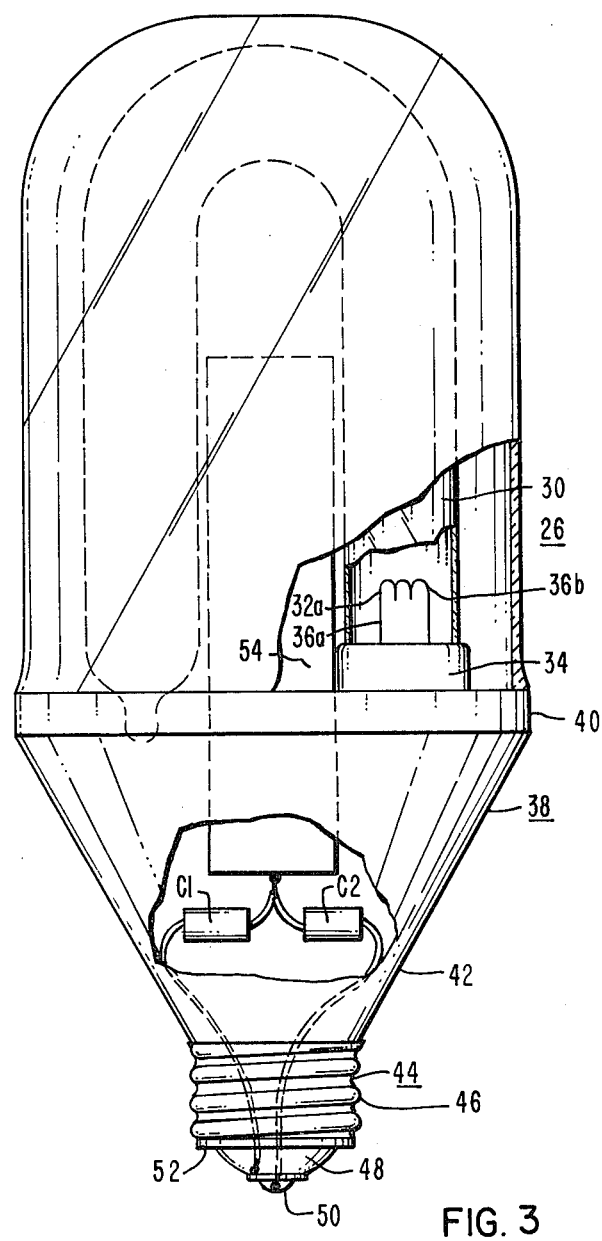
FIG. 3 is an isometric view, partly broken away, of an embodiment of the compact fluorescent lamp unit of the present invention having a double U-bend configuration.

Referring to FIGS. 2 and 3, a compact fluorescent lamp unit 26 is shown comprising a compact fluorescent discharge device comprising an elongated vitreous bulb 30 of predetermined configuration defining an elongated circuitous discharge path such as a double-U-bend configuration shown in FIG. 3. The bulb 30 encloses a discharge-sustaining filling of mercury and a small pressure of inert ionizable starting gas. Typically, a phosphor material such as a blend as disclosed in U.S. Pat. No. 3,858,082, dated Dec. 31, 1974, is carried on the interior surface thereof. The bulb 30 has electrodes 32a, 32b operatively disposed proximate the end of the defined discharge path. End cap means 34 are hermetically sealed to the ends of the bulb 30. Each of the electrodes 32a, 32b has lead-in members 36a, 36b sealed through the end cap means 34.

Housing and support means 38 has an upper portion 40 and a lower portion 42. The upper portion 40 of the housing and support means 38 supports the bulb 30 in a rigidly fixed position. The lower portion 42 of the housing and support means 38 has affixed thereto a screw-type base 44 comprising a metallic shell 46 made of aluminum or brass for example. A glass plug 48 secures a portion of a conductive center eyelet member 50 to fix the center eyelet member 50 in predetermined position such that when the lamp unit 26 is screwed into the socket 12, the eyelet member 50 electrically contacts the third metallic conductor 17. A conductive ring member 52 is also affixed to the glass plug 48 in predetermined position and encircles the conductive center eyelet member 50 in electrical isolation from it. The conductor ring member 52 is positioned so that when the screw-type base 44 is screwed into the socket 12, the ring member 52 electrically contacts the second metallic conductor 16.

A ballast inductor 54 has at least a portion 56 thereof supported by the housing and support means 38. One end of the ballast inductor 54 is connected in circuit with a common electrical point 56. The other end of the ballast inductor 54 is connected in circuit with one of the lead-in members 36a of a first of the electrodes 32a. Capacitive energy storage means 58 comprises two individual capacitors C1, C2. The first of the capacitors C1 is connected in circuit between the common electrical point 56 and the conductive ring member 52. The second of the capacitors C2 is connected in circuit between the common electrical point 56 and eyelet 50. The other of the lead-in members 36b of the first and second electrodes 32a, 32b is connected in circuit with a starting means 60. The starting means 60 may be of the glow-switch type solid state, or a push button for example. It has been found that utilizing the present invention results in about a fifteen percent improvement in regulation of lamp current with variations in the input voltage compared to a purely inductively ballasted lamp. In addition, utilizing the present invention the preset current of the lamp may be adjusted by simply changing capacitor value.

The following table of components specifies typical values for use in the circuit shown in FIG. 2.

TABLE

| Component | | Value |
|---|---|---|
| 30 | 21 | watt double U-bend fluorescent lamp |
| 60 | | starter |
| 56 | 25 | watt choke universal 340 |
| C1 | 4.7 | μf metalized polyester |
| C2 | 5 | μf metalized polyester |

The fluorescent lamp unit 26 shown in FIG. 3 in conjunction with the "standard" three-way incandescent-lamp-type socket shown in FIGS. 1 and 2 operates as follows. When the four-way switching means is in the first switch position, the ballast inductor is deenergized and the lamp unit is off, when the switch is in the second switch position both the first capacitor C1 and the ballast inductor 54 are energized and the lamp unit is in a low-light output state, when the switch is in the third switch position, the second capacitor C2 and the ballast inductor 54 are energized and the lamp unit is in a medium-light output state, and when the switch is in the fourth switch position, both C1 and C2 and the ballast inductor 54 are energized and the lamp is in a high-light output state.

The fluorescent lamp unit of the present invention utilizing an L-C circuit is more readily adaptable for use with longer lamps, such as a 70 volt lamp, for example, than a purely inductive unit.

I claim:

1. A compact fluorescent lamp unit for use with a three-way incandescent-lamp fixture, said fixture including an incandescent-lamp type socket comprising a generally cylindrical metallic screw-type socket member which forms a first metallic conductive member, second and third metallic conductive members mounted in the bottom portion of said socket, and a four-position switching means including first and second contacts, said switching means has a first open position, a second position in which potential is applied between said first and second metallic conductive members, a third position in which potential is applied between said first and third metallic conductive members and a fourth position in which potential is applied between said first and second metallic conductive members and said first and third metallic conductive members, and electrical conductor means adapted to connect said socket to a source of energizing potential, said compact fluorescent lamp unit comprising:

a compact fluorescent discharge device comprising an elongated vitreous bulb of predetermined configuration defining an elongated circuitous discharge path and enclosing a discharge-sustaining filling comprising mercury and inert gas and having electrodes operatively disposed proximate the ends of said defined discharge path, end cap means hermetically sealed to the ends of said bulb, each of said electrodes having lead-in members affixed to the ends thereof and sealed through said end cap means, housing and support means having an upper and a lower portion, the upper portion of said housing and support means supporting said bulb in a rigidly fixed position, the lower portion of said housing and support means having affixed thereto a screw-type base comprising a metallic shell, a glass plug affixed to the bottom portion of said metallic shell, said glass plug securing a portion of a conductive center eyelet member to fix said center eyelet member in predetermined position such that when said lamp unit is screwed into said socket, said eyelet electrically contacts said third metallic conductive member, a conductive ring member affixed to said glass plug in predetermined position and encircling said conductive center eyelet member in electrical isolation from it, said conductive ring member positioned such that when said lamp unit is screwed into said socket said ring member electrically contacts said second metallic conductive member, a ballast inductor having at least a portion thereof supported by said housing and support means, one end of said ballast inductor connected in circuit with a common electrical point and the other end of said ballast inductor connected in circuit with one of said lead-in members of a first of said electrodes, capacitive energy storage means comprising two individual capacitors, the first of said capacitors connected in circuit between said common electrical point and said second metallic conductive member, the second of said capacitors connected in circuit between said common electrical point and said third metallic conductive member, one of said lead-in members of a second of said electrodes connected in circuit with said metallic shell, the other of the lead-in members of said first and second electrodes connected in circuit with a starting means, whereby in said first switch position said ballast inductor is deenergized and said lamp unit is off; in said second switch position said first capacitor and said ballast inductor are energized and said lamp unit is in a low-light output state; in said third switch position said second capacitor and said ballast inductor are energized and said lamp unit is in a medium-light output state; and, in said fourth switch position both said first and second capacitors and said ballast conductor are energized and said lamp unit is in a high-light output state.

* * * * *